United States Patent
Chinnadurai et al.

(10) Patent No.: US 8,296,035 B2
(45) Date of Patent: Oct. 23, 2012

(54) POWER BALANCING FOR VEHICLE DIAGNOSTIC TOOLS

(75) Inventors: Manokar Chinnadurai, Owatonna, MN (US); Troy Liebl, Owatonna, MN (US); Phillip McGee, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 567 days.

(21) Appl. No.: 12/477,030

(22) Filed: Jun. 2, 2009

(65) Prior Publication Data

US 2009/0299539 A1    Dec. 3, 2009

Related U.S. Application Data

(60) Provisional application No. 61/058,072, filed on Jun. 2, 2008.

(51) Int. Cl.
*G06F 19/00* (2011.01)

(52) U.S. Cl. .......................... 701/99; 701/117; 324/426

(58) Field of Classification Search .................... 701/29, 701/36, 50, 117, 29.1, 99; 324/426
See application file for complete search history.

(56) References Cited

U.S. PATENT DOCUMENTS

| | | | |
|---|---|---|---|
| 4,404,639 A * | 9/1983 | McGuire et al. ............. 701/29.3 |
| 5,884,202 A | 3/1999 | Arjomand |
| 6,693,367 B1 * | 2/2004 | Schmeisser et al. .......... 307/9.1 |
| 7,299,122 B2 | 11/2007 | Perkins |
| 7,596,636 B2 * | 9/2009 | Gormley .......................... 710/8 |
| 7,642,787 B2 * | 1/2010 | Bertness et al. .............. 324/426 |
| 7,688,074 B2 * | 3/2010 | Cox et al. ...................... 324/426 |
| 7,705,602 B2 * | 4/2010 | Bertness ....................... 324/426 |
| 7,999,505 B2 * | 8/2011 | Bertness ....................... 320/104 |
| 8,046,501 B2 * | 10/2011 | Gormley ........................... 710/8 |
| 2003/0080621 A1 | 5/2003 | Kirk |
| 2003/0088346 A1 | 5/2003 | Calkins et al. |
| 2004/0054503 A1 | 3/2004 | Namaky |
| 2004/0143382 A1 | 7/2004 | Ishida |
| 2005/0239496 A1 | 10/2005 | Sylvain |
| 2007/0032927 A1 | 2/2007 | Chinnadurai |
| 2008/0071440 A1 | 3/2008 | Patel et al. |
| 2008/0086246 A1 | 4/2008 | Bolt et al. |
| 2008/0103652 A1 | 5/2008 | McGee et al. |
| 2008/0119981 A1 | 5/2008 | Chen |
| 2009/0125179 A1 | 5/2009 | Miller et al. |
| 2009/0271239 A1 | 10/2009 | Underdal et al. |
| 2009/0281687 A1 | 11/2009 | Keane |
| 2010/0262335 A1 | 10/2010 | Brozovich |

* cited by examiner

*Primary Examiner* — Toan To
(74) *Attorney, Agent, or Firm* — Baker & Hostetler, LLP

(57) ABSTRACT

A power balancing system includes a vehicle communication device connected to a data link connector of a vehicle, and a scan tool connected to the vehicle communication device, the scan tool including a handset and a vehicle connector interface (VCI), wherein power can be received from one or more of an external power source being external from the VCI, the vehicle, and an internal power supply of the scan tool, and wherein the system balances the received power.

12 Claims, 3 Drawing Sheets

POWER BALANCING FOR VEHICLE DIAGNOSTIC TOOLS

PRIORITY

The present application claims priority to U.S. Provisional Application No. 61/058/072, filed Jun. 2, 2008, the disclosure of which is hereby incorporated herein in its entirety.

FIELD OF THE INVENTION

The present invention relates generally to a vehicle diagnostic tool. More particularly, the present invention relates to power balancing of a vehicle diagnostic scan tool.

BACKGROUND OF THE INVENTION

Vehicle diagnostic scan tools are used to diagnose issues in the vehicle under test. The scan tools are built with increasing capabilities that include larger color screens that are capable of being read in direct sunlight, and internet and networking capabilities and thus require more power. The tool can be directly linked to a vehicle's data link connector (DLC) in order to communicate with the vehicle's on-board diagnostic system, such as OBD-II (On Board Diagnostic). Once the tool is connected to the DLC, it can draw power from the vehicle's battery. However, depending on the usage, the tool can draw too much power from the vehicle's battery and damage the vehicle's battery. Additionally, the scan tool can be equipped with its own internal power supply (battery), however, by using the scan tool's internal power supply the amount of time that a technician can use the scan tool is limited.

Accordingly, it is desirable to provide a system and method that power balance the scan tool's draw of power between a vehicle, the scan tool's battery and any other available power source.

SUMMARY OF THE INVENTION

Accordingly, embodiments of the present invention provide a system and method that power balance the scan tool's draw of power between a vehicle, the scan tool's battery and any other available power source.

An embodiment includes a power balancing system which includes a vehicle communication device connected to a data link connector of a vehicle, and a scan tool connected to the vehicle communication device, the scan tool including a handset and a vehicle connector interface (VCI), wherein power can be received from one or more of an external power source being external from the VCI, the vehicle, and an internal power supply of the scan tool, and wherein the system balances the received power.

Another embodiment includes a method of balancing power, the method including receiving power from one of more of an external power source being external from a vehicle connector interface (VCI), a vehicle, and an internal power supply of a scan tool connected to a vehicle communication device connected to a data link connector of the vehicle, the scan tool including a handset, and a vehicle connector interface (VCI), and balancing the received power.

Another embodiment includes a power balancing system, including means for receiving power from one of more of means for an external power source from a vehicle connector interface (VCI), a vehicle, and means for an internal power supply of a scan tool connected to a vehicle communication device connected to a data link connector of the vehicle, the scan tool including a handset, and means for a vehicle connector interface (VCI), and means for balancing the received power.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject'matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
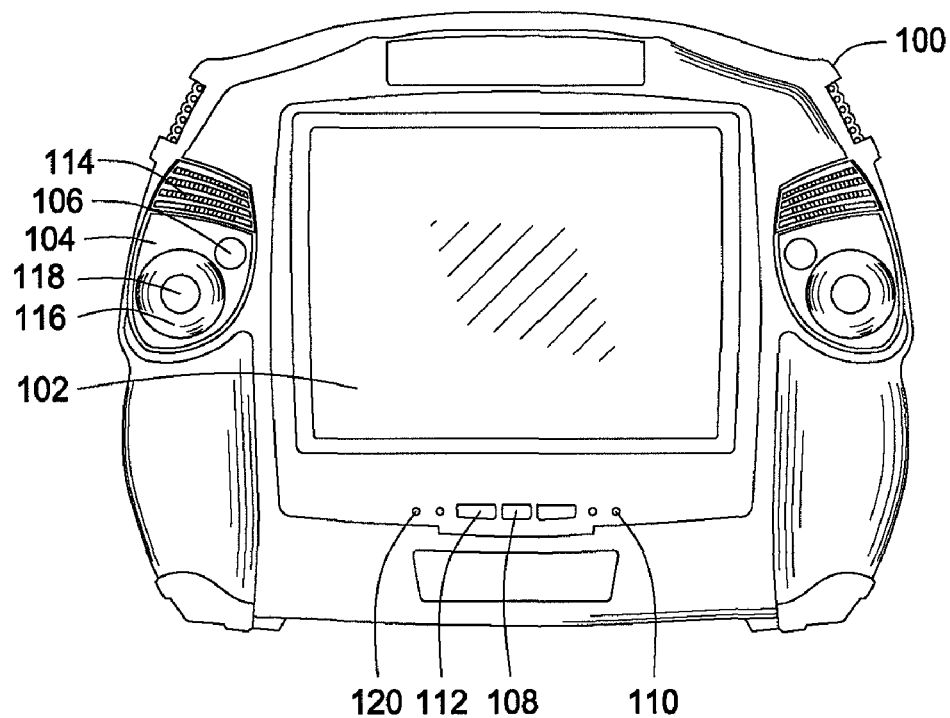
FIG. 1 illustrates a front view of a scan tool according to an embodiment of the invention.

The invention will now be described with reference to the drawing figures, in which like reference numerals refer to like parts throughout. An embodiment in accordance with the present invention provides a system and a method that allows a scan tool to balance the draw of power from various power sources.

FIG. 1 illustrates a front view of a scan tool 100 according to an embodiment of the invention. The scan tool 100 includes a display 102, a scroll device 104, a power button 108, LED indicators 110 and function buttons 112. The display can be any type of display including LCD, VGA, OLED, SVGA and other types of displays including touch screen displays. The display may be a colored or non-colored display. The display can display information such as the make, model, year of vehicles that the scan tool can diagnose, the various diagnostic tests the scan tool can run, diagnostic data the scan tool has received, and baseline data of the various components in a vehicle. Additionally, the display can show videos for the user to view and the accompanying audio can be heard via the built in speakers 114. The speakers 114 can be a single speaker or multiple speakers for stereo sound. In one embodiment, the display allows the user to input selection through the touch screen for interactive navigation and selection, wherein the technician can select a menu item by touching the selection on the screen.

The scroll device 104 can be used to scroll through information or menus on the display, such as vehicle information or available diagnostic tests. In one embodiment, there is one scroll device 104 and in another embodiment there are two or more scroll devices 104. When two scroll devices 104 are present, the user can have dual controls of the menus or the selections on the display. By having two scroll devices, it may be easier for a technician to use regardless if he were left-handed or right-handed. For example, the scroll device 104 may include an "enter" button 118 so that a user can select a menu item, for example, a vehicle or a diagnostic test. The scroll device 104 may also include a scroll wheel 116 that can rotate around the "enter" button 118. The scroll wheel 116 may also include up, down, left and right arrow controls. The scroll wheel 116 can allow the technician to move an indicator on the screen so that the information including menus can be scrolled and a selection on the screen can be made. The scroll wheel 116 may be configured for a fast response or fast scrolling. The scroll device 104 may also include a scroll button 106, such as an "esc" button, "back" button, "forward" button, or any other button desired by the technician. Any components of the scroll device 104, including the scroll button 106, can be programmed for any desired functionality.

The face of the scan tool 100 may include the power button 108 that allows the technician to power "on" and "off" the scan tool 100. The power button 108 can also be used to put the tool 100 into a standby mode in order to save battery power when not in use. Also on the face of the scan tool 100 may be LEDs to indicate various status of the functionality of the scan tools, such as wireless connectivity or network connectivity, low battery and any other indicators desired by the technician. The face of the scan tool may further include function buttons 112 that when pressed allows a user to perform a function such as controlling the brightness of the display, volume of the speakers or any other function desired by the technician. A microphone 120 may allow the technician to record information such as the noise being made by the vehicle for later analysis or for comparison with stored data. Further, the technician can also record comments or notes during the testing for later retrieval and analysis.

Figure 2:
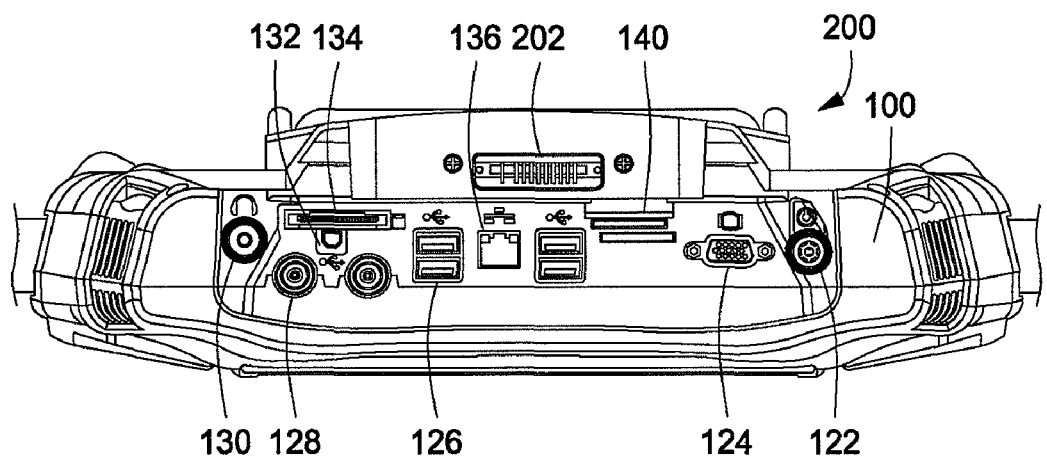
FIG. 2 is an upper view of the scan tool coupled to an optional vehicle connector interface (VCI) according to an embodiment of the invention.

FIG. 2 is an upper view of the scan tool 100 coupled to an optional vehicle connector interface (VCI) 200 according to an embodiment of the invention. Turning to the connections available on the scan tool 100, the scan tool 100 can be connected to an A/C power source via the A/C power connector 122. The A/C can power the scan tool 100 and recharge the scan tool's internal battery (not shown). A VGA video connector 124 may allow the information on the scan tool 100 to be displayed on an external display, such as a display on a personal computer.

A series of host USB (universal serial bus) connectors 126 may be available to couple additional devices to the scan tool 100. In one embodiment, there are four connectors, but more or fewer connectors are contemplated by the invention. Additional devices can add functionality to the scan tool 100 or allow the scan tool 100 to add functionality to another device, such as the VCI 200. The functionality can include communications, printing, memory storage, video and other functionality. A two-channel scope connections 128 may allow for a scope to be connected to the scan tool 100. The invention is not limited to the two-channel connection 128. The scope can provide various measurement of signals such as volts, ohms, dwell, duty cycle, peak to peak, peak volts, injector pulse width, injector on time, firing kV, burn kV, burn voltage, and other measurement of signals.

A stereo headphone connection 130 may allow the technician to add a headphone to the scan tool 100. A USB device slot 132 can also add functionality to the scan tool 100 by another device or adds functionality of the scan tool 100 to another device. An express card slot 134 may be provided to add functionality, such as a wireless modem, memory, TV tuner, networking, mouse, remote control, and other functionalities to the scan tool 100. An Ethernet connector 136 allows for a network connection with the scan tool 100 in order to transfer data to and from the scan tool 100 to a remote device such as a server or personal computer. SDIO (Secure Digital Input Output) 140 cards slots 140 can be provided on the scan tool 100 to provide still additional functionality such as GPS receivers, Wi-Fi or Bluetooth adapters, modems, Ethernet adapters, barcode readers, IrDA adapters, FM radio tuners, TV tuners, RFID readers, and other mass storage media such as hard drives. The possible connections are not limited to those shown in FIG. 2, but additional connectors are contemplated such as, without limitation, Firewire, HDMI, parallel, and serial connections.

When the VCI 200 is docked with the scan tool 100, the VCI 200 will be the device that is connected to the vehicle's DLC for diagnosis. A vehicle connector 202 on the VCI 200 allows the VCI 200 to connect to the vehicle's DLC and exchange data via a cable (not shown). The DLC can provide power to the scan tool 100 or the VCI 200 via the vehicle's battery.

Figure 3:
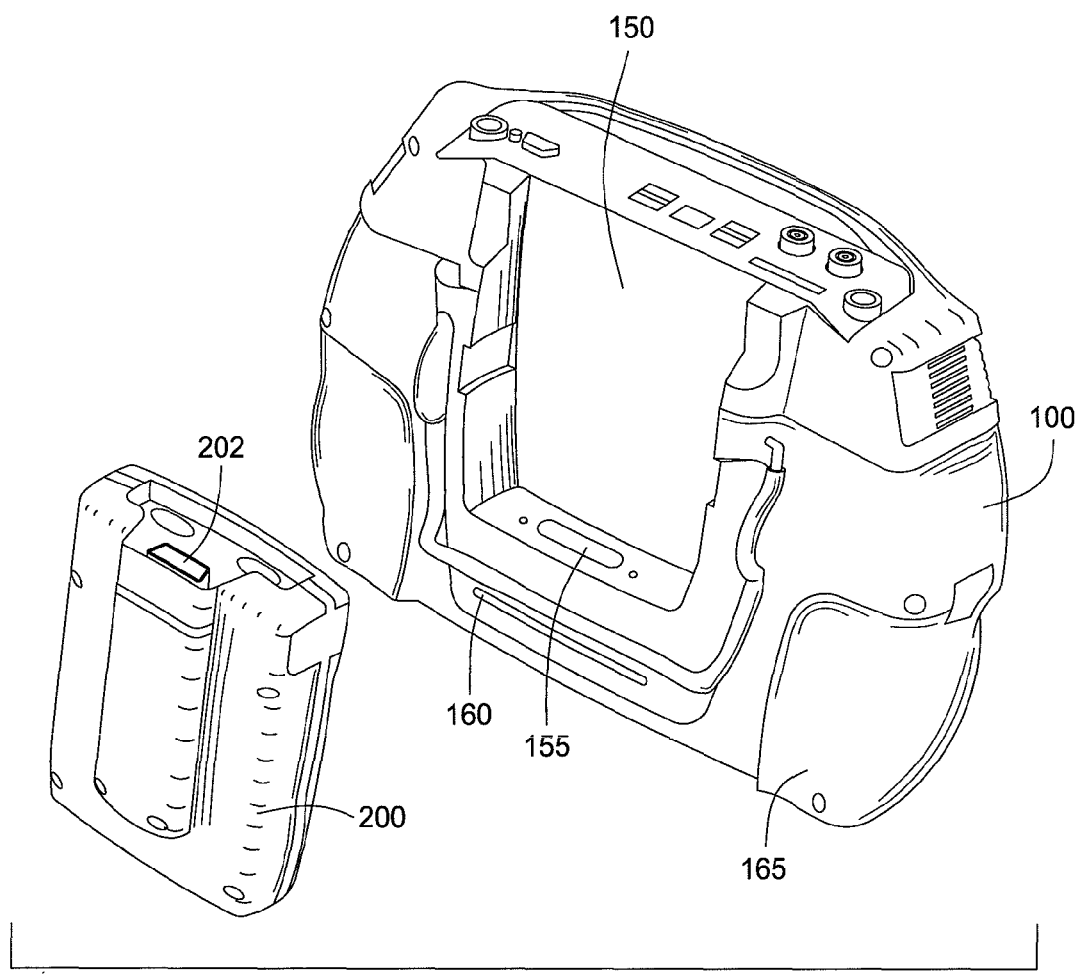
FIG. 3 illustrates a perspective view of the scan tool and the VCI uncoupled according to an embodiment of the invention.

FIG. 3 illustrates a perspective view of the scan tool 100 and the VCI 200 uncoupled according to an embodiment of the invention. FIG. 3 illustrates a back view of the scan tool 100, wherein a VCI receiving portion 150 is constructed to receive the VCI 200. A VCI connector 155 allows the VCI 200 to connect with the scan tool 100. Once connected, the VCI and the scan tool 100 can communicate with each other. Additionally, the VCI 200 and the scan tool 100 can provide power to each other as needed through the VCI connector 155. A grip portion 165 may be provided on each side of the scan tool 100. The grip portion 165 can be made of any material including an elastomeric material. A handle 160 may be provided on the back side of the scan tool 100 in order for the technician to move the scan tool 100 from one place to another.

Figure 4:
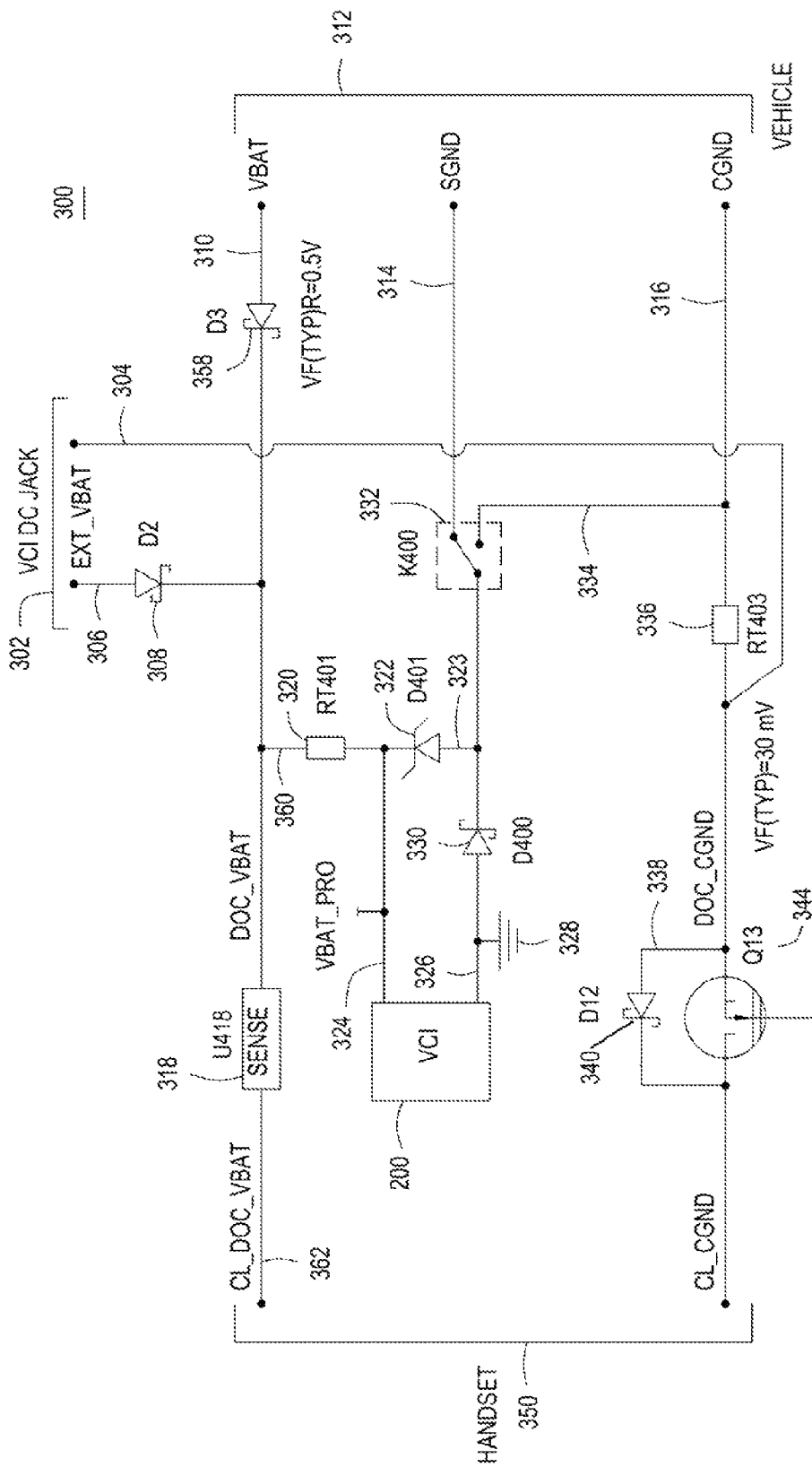
FIG. 4 illustrates a wiring diagram of a power balancing system according to an embodiment of the invention.

FIG. 4 illustrates an example electrical schematic diagram for a power balancing system 300 according to an embodiment of the invention. The VCI 200 can be powered via a DC jack 302, which can accept a connection from an external battery or other electrical power source. In some embodiments, the VCI 200 can be powered via an optional AC jack and appropriate power conversion circuitry (not shown).

In one embodiment of the invention, the electrical ground for the DC jack 302 is connected to the chassis ground of the vehicle 312, first through electrical node 304 (DOC_CGND), next through the current-limiting resistor or equivalent protection device 336 (RT403), then through electrical node 316 (CGND) which is physically connected to the vehicle 312 using the Vehicle Cable Connector 202 (FIG. 2 and FIG. 3). The current-limiting resistor or equivalent protection device 336 (RT403) may be any type of resistor or resistance circuit including a thermistor, or it may be a fuse or any another electronic component with a similar purpose or function.

In one embodiment of the invention, the electrical power supplied through the DC jack 302 may be conveyed to the core functional elements of the VCI device 200 and to the handset device 350 to which the VCI device 200 is docked.

The core of the VCI device 200 receives power through the sequence consisting first of electrical node 306 (EXT_VBAT), next reverse current protection diode 308 (D2), then electrical node 360 (DOC_VBAT), and finally through the current-limiting resistor or equivalent protection device 320 (RT401), to electrical node 324 (VBAT_PRO). The current-limiting resistor or equivalent protection device 320 (RT401) may be of any type of resistor, or alternatively it may be a fuse or any another electronic component with a similar purpose or function. The core of the VCI device 200 is protected from overvoltage by protection diode 322 (D401), which may be a transient voltage suppression (TVS) diode or equivalent. Also, the core of the VCI device 200 may be protected by optional reverse current protection diode 330 (D400).

Similarly, the handset 350 can also receive the electrical power made available on electrical node 360 (DOC_VBAT). This is achieved through the current sensing circuit 318 (U418) and electrical node 362 (CL_DOC_VBAT), which is included within the VCI Docking Connector 155 (FIG. 3).

Additionally, capability is provided for electrical power to be supplied to the VCI device and the Handset 350 by the existing battery or other power source typically included within the vehicle 312. This is accomplished through an electrical connection within the Vehicle Cable Connector 202 (FIG. 2 and FIG. 3) that joins the non-grounded terminal (not shown) of the battery within vehicle 312 to electrical node 310 (VBAT), which then connects through diode 358 (D3), providing electrical power to electrical node 360 (DOC_VBAT). The power is then conveyed as described above.

In various embodiments of the invention, the handset device 350 also contains one or more of its own power sources, which may include an internal battery (not shown), the handset's A/C Power Connector 122 (FIG. 2), power sourced from the handset's USB Device Slot 132 (FIG. 2), or other power sources not listed. Embodiments of handset 350 with multiple power sources are capable of selecting one or more of the most appropriate power sources for a given situation, which typically would involve selecting a power source in good working order, prioritizing the use of power from electrical node 362 (CL_DOC_VBAT), and switching to an alternative power source if power from electrical node 362 is interrupted.

The connection between electrical node 362 and the handset 350, along with the presence of other power sources within handset 350, could result, under certain particular circumstances, in the reverse flow electrical power from that described above, that is, from one or more power sources within the handset device 350, then through the VCI Docking Connector 155 (FIG. 3), through electrical node 362 (CL_DOC_VBAT), and into electrical node 360 (DOC_VBAT). This situation would allow the core of the VCI 200 to be powered by the handset 350, which would be beneficial when no power is available either from the DC jack 302 or from the battery within the vehicle 312. Various embodiments of the invention may be configured to prevent, allow, or otherwise control this reversed power flow, such as through the use of diodes within the handset device 350, and some embodiments may include other manners of managing, controlling, switching on and off, and selecting other characteristics of reversed power flow if and when allowed to occur.

An embodiment of the invention reconfigures diode 358 (D3) with other additional and/or replacement components to permit power to flow through electrical node 310, in the opposite direction from that described above, into vehicle 312, such as to charge the battery typically contained within vehicle 312 through the use of one or more of the other power sources available to the invention.

Line 326 also includes a switch 332 that switches from a first position to a second position depending on the power source being utilized so that in some embodiments, the ground utilized by the system can be SGND (signal ground) along line 314 or CGND (chassis ground) along line 316. In one embodiment, the default is SGND. Line 334 connects to the switch 332 at one end and at the other end to line 316. Line 316 on one end includes the CGND (chassis ground) in the vehicle and at the other end includes CL_CGND.

Line 316 includes by-pass line 338 that includes diode 340 (D12). A controller switch 342 is a type of electronic switch that is off when the handset 350 draws too much power from the VBat of the vehicle and is on to allow the handset to draw power from the VBat when the handset is not drawing too much power. The controller switch 342 can be controlled by the CPLD (not shown) within the VCI. The CPLD also communicates with the sense 318 on line 310 to sense the current being drawn by the handset. The CPLD uses the sense 318 in conjunction with the controller switch 342 in order for the system to operate on a duty cycle according to one embodiment of the invention. Thus, the system monitors the current being drawn from the vehicle's battery by the scan tool and if the current being drawn exceeds a predetermined amount, such as, for example, 4-6 amps, then the current monitoring system cuts power to the scan tool so that the scan tool uses its own battery source. After a predetermined period of time, the current monitoring system enables power from the vehicle to the scan tool so that the scan tool's battery is not being used at all times. The current monitoring system continues this monitoring process when the scan tool is connected to the VCI or in other embodiments directly with the vehicle.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A power balancing system, comprising:
 a vehicle communication device configured to connect to a data link connector of a vehicle; and
 a scan tool configured to connect to the vehicle communication device, the scan tool comprising:
  a handset; and
  a vehicle connector interface, wherein power to the vehicle communication device is received from one or more of: an external power source being external from the vehicle communication device, the vehicle, and an internal power supply of the scan tool, and wherein the system balances the received power.

2. The power balancing system of claim 1, further comprising:
 a circuit to select one or more of the most appropriate power sources for a given situation;
 the circuit prioritizes the use of power from a power input node in the scan tool; and
 the circuit switches to an alternative power source if power at the power input node is interrupted.

3. The power balancing system of claim 2, wherein the circuit selects one or more of the most appropriate power sources based on whether a power source is in good working order.

4. The power balancing system of claim 1, wherein the vehicle communication device is configured to provide power to one or more of the vehicle and the handset.

5. The power balancing system of claim 1, where the vehicle communication device comprises:
   a vehicle communication device core;
   a reverse-current protection diode to receive power from the external power source; and
   a current-limiting circuit.

6. The power balancing system of claim 5, wherein the reverse-current protection diode receives power from the vehicle.

7. The power balancing system of claim 5, wherein the vehicle communication device further comprises a current sensing element that receives power from the handset.

8. The power balancing system of claim 7, wherein the vehicle communication device further comprises a switch for selecting between a signal ground and a chassis ground based on the selected power source.

9. The power balancing system of claim 6, wherein the vehicle communication device further comprises a controller switch configured to be:
   in a first state to prevent the handset from drawing power from the vehicle when the handset draws too much power from the vehicle; and
   in a second state to allow the handset to draw power from vehicle when the handset is not drawing too much power.

10. A power balancing system, comprising:
    means for receiving power from one or more of:
       means for an external power source from a vehicle connector interface, a vehicle, and means for an internal power supply of a scan tool configured to be connected to a vehicle communication device connected to a data link connector of the vehicle, the scan tool comprising:
       a handset; and
       means for a vehicle connector interface, and
    means for balancing the received power.

11. The power balancing system of claim 10, wherein the means for balancing the power comprises:
    means for selecting one or more of the most appropriate power sources for a given situation;
    means for prioritizing the use of power from a power input node in the scan tool; and
    means for switching to an alternative power source if power at the power input node is interrupted.

12. The power balancing system of claim 11, wherein the means for selecting one or more of the most appropriate power sources comprises means for selecting a power source in good working order.

\* \* \* \* \*